United States Patent [19]
Itoh et al.

[11] Patent Number: 5,493,640
[45] Date of Patent: Feb. 20, 1996

[54] METHOD AND APPARATUS FOR IMAGE FILLING OF A CONTINUOUS CONTOUR FIGURE

[75] Inventors: Masatoshi Itoh, Fujisawa; Masaya Mori, Yamato; Yasumasa Tomonaga, Sagamihara, all of Japan

[73] Assignee: International Business Machines Corporation, Armonk, N.Y.

[21] Appl. No.: 94,825

[22] Filed: Jul. 20, 1993

[30] Foreign Application Priority Data

Jul. 20, 1992 [JP] Japan ................................. 4-192009

[51] Int. Cl.⁶ ........................................... G06T 11/40
[52] U.S. Cl. ..................................... 395/141; 382/199
[58] Field of Search ........................... 382/22, 24, 25, 382/199, 202, 203; 345/139, 133, 135; 395/133, 141, 134

[56] References Cited

U.S. PATENT DOCUMENTS

| | | | |
|---|---|---|---|
| 4,763,119 | 8/1988 | Matsubara et al. .................. | 395/133 |
| 4,815,009 | 3/1989 | Blatin .................................... | 395/132 |
| 4,998,211 | 3/1991 | Hamada et al. ...................... | 345/135 |
| 5,038,385 | 8/1991 | Kasahara ............................... | 382/22 |
| 5,043,711 | 8/1991 | Harrington ........................... | 345/133 |
| 5,073,960 | 12/1991 | Nakai et al. ........................ | 382/22 |
| 5,371,843 | 12/1994 | Pomichter, Jr. ..................... | 395/141 |

Primary Examiner—Joseph Mancuso
Assistant Examiner—Larry J. Prikockis
Attorney, Agent, or Firm—Mark S. Walker

[57] ABSTRACT

The fill processing time for filling a closed figure identified by one stroke is reduced. The difference between the total number of line segments in the plus Y axis direction and that in the minus Y direction intersecting a line perpendicular to a specific first direction is counted when a figure identified by one stroke is scanned in the X axis direction. Pixel positions in a range in which the counting result is not "0" are filled.

5 Claims, 16 Drawing Sheets

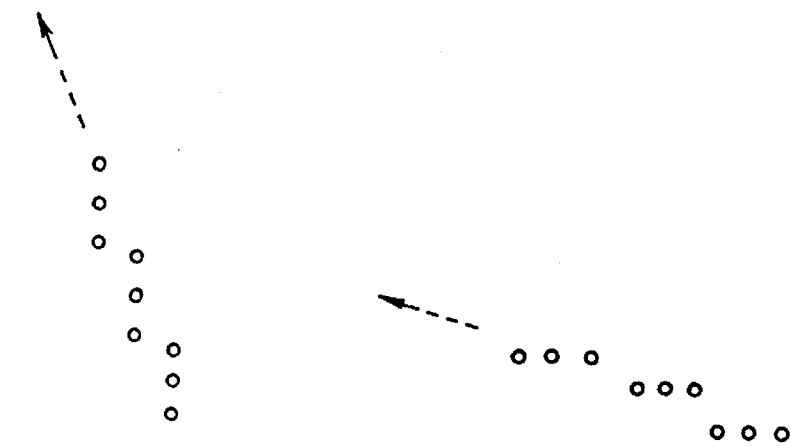
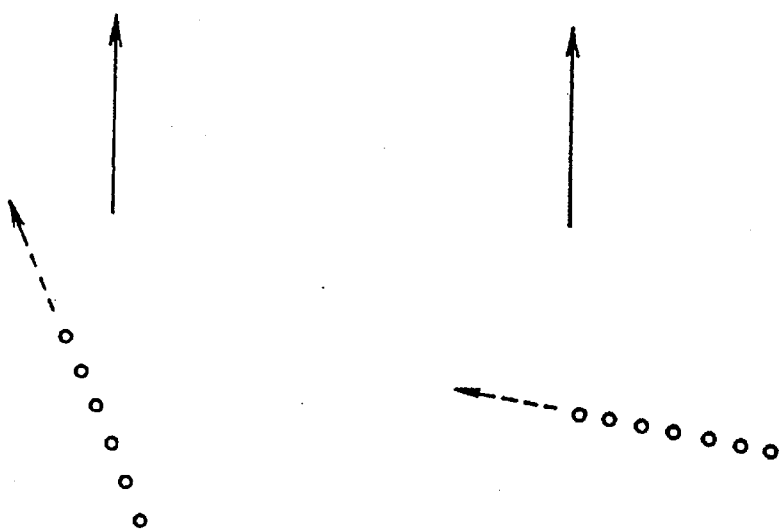
FIG. 4A
FIG. 4B

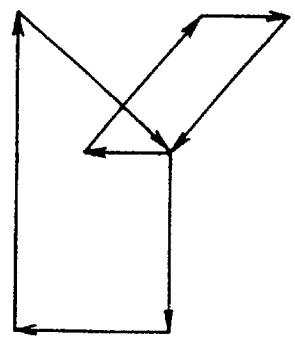
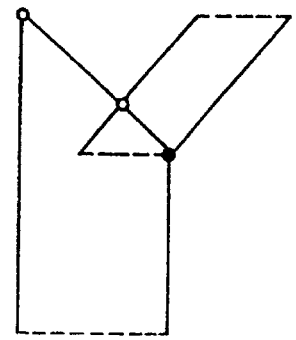
FIG.7A  FIG.7B
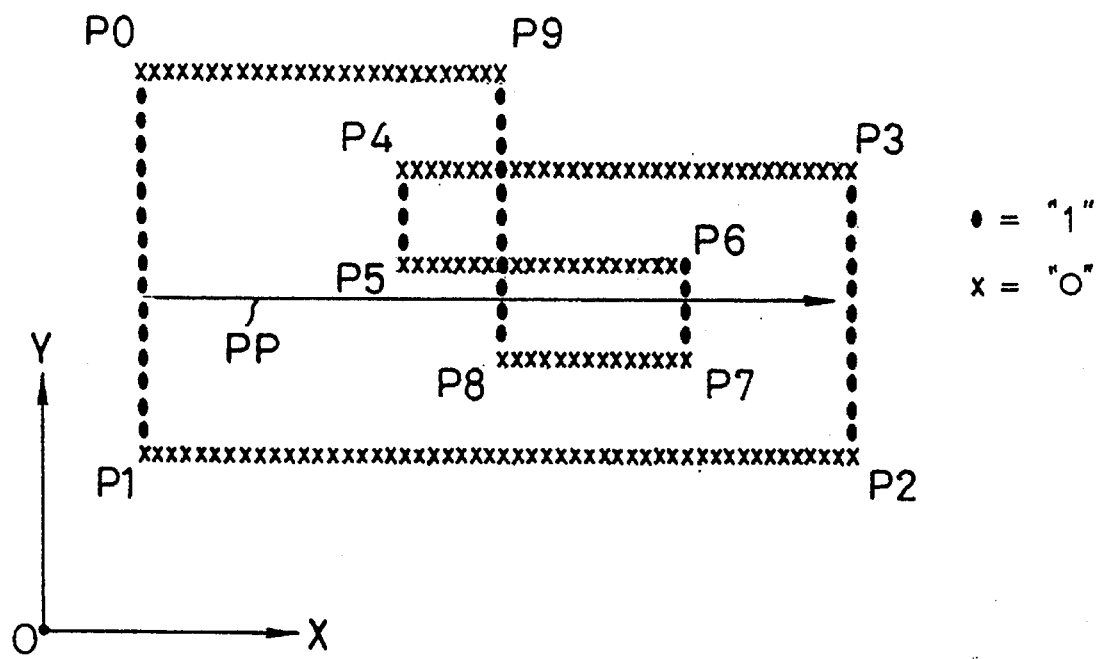
FIG.8

| END POINT | END POINT COORDINATE | | VECTOR INFORMATION |
|---|---|---|---|
| P10 | x10 | y10 | 1 |
| P11 | x11 | y11 | 3 |
| P12 | x12 | y12 | 2 |
| P13 | x13 | y13 | 3 |
| P14 | x14 | y14 | 1 |
| | | ⋮ | |

FIG.15

/ : PART TO BE FILLED

METHOD AND APPARATUS FOR IMAGE FILLING OF A CONTINUOUS CONTOUR FIGURE

BACKGROUND OF THE INVENTION

1. Field of the Invention

The present invention relates to an image processing method of filling a specific closed area in an image with particular color dots or figures and an image processing apparatus therefor.

2. Background and Related Art

In the prior art, where a closed image region is filled, the closed image region is displayed on a screen of an image processing apparatus and an operator indicates one point in the closed image region to be filled with a pointing device. The image processing apparatus completes fill processing by detecting the closed area including the point in a memory which stores image data, and converting the detected image data inside of the closed area into the same image data. In such fill processing, since the operator must indicate a closed image region to be filled, the fill processing has a disadvantage that the indication operation becomes complicated when a plurality of closed areas are overlapped.

Lately, some image processing methods of automatically filling a specific closed image region based on a predetermined condition have been proposed. Among these methods, a method is well known in which an operator indicates a contour forming a closed area to be filled by one stroke (see FIG. 18). Forming a contour with one stroke refers to forming a contour with a single continuous line starting at "start point" and ending at that same point. This image processing method is known as Winding Rule Fill method and has an advantage that a contour is easily inputted. In Winding Rule Fill method, a closed image region is filled in the following image processing procedure.

In FIG. 18, a halfline A is formed from an arbitrary point O, e.g., a center position in a closed image region (region enclosed by linking points A, B, C and D) to a particular direction, in a memory in an image processing apparatus. Next, a progress direction of a contour drawn by one stroke crossing the halfline A, is analyzed by the image processing apparatus. On a basis of a result of the analysis, the number of clockwise intersecting contours and the number of counterclockwise intersecting contours are counted. When the total number of clockwise intersecting contours is just equal to the total number of counterclockwise intersecting contours, it is judged that the closed region (region enclosed by linking points A, B, C, D) including the point O is to be filled and inside of this region is filled on the memory in the image processing apparatus.

Thus, it is judged whether other closed image regions are to be filled or not by the image processing apparatus, and a region in closed regions, which matches the filling condition given by an operator, is filled.

An image processing apparatus has the following disadvantage when the image processing apparatus performs fill processing by the above Winding Rule Fill method:

(1) Since fill processing is composed of many kinds of processing including the processing for determining a center position used for judging of filling, the processing for calculating an intersection of a contour and a halfline, a process for checking a direction of the contour including the intersection and the like, fill processing takes a long time.

(2) An image processing apparatus requires a large capacity memory for storing image data and processing-related data so as to perform the above many kinds of processing.

Based on the above points, it is an object of the present invention to provide an image processing method and an image processing apparatus in which fill processing can be performed at a high speed and memory capacity used for fill processing can be minimized.

SUMMARY OF THE INVENTION

To solve the above problems, in a first aspect of the present invention a method of creating one or more closed image regions with a contour drawn by one stroke and filling specific regions in said one or more closed image regions which are created, comprises the steps of:

analyzing to determine whether a progress direction of a line segment of one stroke is a direction of a first straight line or a direction of a second straight line opposite to the first straight line for each line segment constituting the contour;

storing in expanded form each of the results of the analysis on a storage medium corresponding to a pixel position of the line segment;

scanning the expanded results in a direction of a third straight line perpendicular to the first straight line from the result of the analysis, to calculate and store a difference between the total number of intersections in a first result of the analysis indicating the direction of the first straight line and the total number of intersections in a second analysis indicating the direction of the second straight line from a scanning start position till a current scanning position, at each time the result of the analysis detecting an intersection on a scanning line; and judging if the difference is zero or not in each scanning position, and recognizing that the scanning position to be judged is an unfilled pixel position in the case where the difference is positive and that the scanning position to be judged is a filled pixel position in the case where the difference is negative.

In a second aspect of the present invention, an image processing method, the result of the analysis is composed of first information, in which the direction of the first straight line or others in binary bit values is shown, and second information in which it is shown in binary bit values whether the line segment to be analyzed is in parallel to the direction of the first straight line or not, the second information is used when the result of the analysis which indicates intersecting the scanning line is detected, and it is recognized whether the result of the analysis is the first result of the analysis or the second result of the analysis on a basis of the first information.

In a third aspect of the present invention, an image processing method, an up-down counter is used to calculate the difference and it is recognized whether the result of the analysis is the first result of the analysis or the second result of the analysis at each time an intersection on the scanning line is detected, and the up-down counter is incremented by one in the case where the result of the recognition is the first result of the analysis and the up-down counter is decremented by one in the case where the result of the recognition is the second result of the analysis to calculate and store the difference.

In a fourth aspect of the present invention, in an image processing method where an up-down counter is used to calculate the difference, it is recognized whether the result of the analysis is the first result of the analysis or the second result of the analysis at each time an intersection on the scanning line is detected, and the up-down counter is incremented by one in the case where the result of the recognition is the first result of the analysis and the up-down counter is decremented by one in the case where the result of the recognition is the second result of the analysis to calculate and store the difference.

In a fifth aspect of the present invention, an image processing apparatus which creates one or more closed image regions with a contour drawn by one stroke and fills specific regions among the created one or more closed image regions which are created, comprises:

analyzing means for analyzing that a progress direction of a line segment of one stroke is a direction of a first straight line or a direction of a second straight line opposite to the first straight line for each line segment constituting the contour;

image processing means for storing in expanded form the result of the analysis at a storage medium location corresponding to a pixel position of the line segment;

processing means for scanning in a direction of a third straight line perpendicular to the first straight line, calculating and storing a difference between the total number of a first result of the analysis indicating the direction of the first straight line and the total number of a second result of the analysis indicating the direction of the second straight line from a scanning start position to a current scanning position at each time an intersection on a scanning line is detected; and recognizing means for judging whether the difference is zero or not in each scanning position, and recognizing that the scanning position to be judged is an unfilled pixel position in the case where the difference is positive and that the scanning position is a filled pixel position in the case where the difference is negative.

The applicant of the present invention discovered that because of a feature in which a contour drawn by one stroke returns to a start point of the drawing, when a line perpendicular to a specific first direction, e.g., the Y axis direction, intersects an image of a contour, in addition to the total number of line segments in a clockwise direction being equal to the total number of line segments in a counter-clockwise direction at the intersections, furthermore the total number of line segments in the plus direction of the Y axis is also equal to the total number of line segments in the minus direction of the Y axis at the intersections. The applicant proposes an image processing method and an image processing apparatus in which filling is performed on a basis of the above feature. In the first and fifth aspects of the present invention, line segments of the contour in the plus direction of the Y axis and line segments of the contour in the minus direction of the Y axis are counted and summed up in the X axis direction perpendicular to the Y axis direction. Some cases occur that a difference between the total number in the plus direction of the Y axis and the total number in the minus direction of the Y axis, is zero.

Thus, a closed region, in which the difference is zero, is nominated as a region not to be filled, while a closed region, in which the difference is not zero, is nominated as a region to be filled, and this can realize automatic fill processing.

In the second aspect of the present invention, as the first information and the second information constituting the analysis are represented in binary bit information, image processing for determining whether a region is filled or not can be simplified, and information capacity can be also made small.

In the third aspect of the present invention, since an up-down counter is used for calculating the difference so as to detect a closed image region to be filled, the processing can be simplified.

In the fourth aspect of the present invention, since information of the progress direction of a contour is represented in multibits in order to indicate a plurality of progress directions, position information about a boundary line of a closed region surrounded with a contour and information which shows a progress direction of line segments of the contour used for detecting a region to be filled, can be stored on the same storage area.

The foregoing and other objects, features and advantages of the invention will be apparent from the following more particular description of a preferred embodiment of the invention, as illustrated in the accompanying drawing wherein like reference numbers represent like parts of the invention.

BRIEF DESCRIPTION OF THE DRAWING

FIG. 4 is a view for depicting the pixel approximation of oblique lines drawn using a scan line algorithm;

FIG. 7 is a view for explaining the point not to be filled on the image of the contour;

FIG. 8 is a view showing contents of figure bit data;

FIG. 15 is a view showing vector information of embodiment 2;

DETAILED DESCRIPTION

Figure 1:
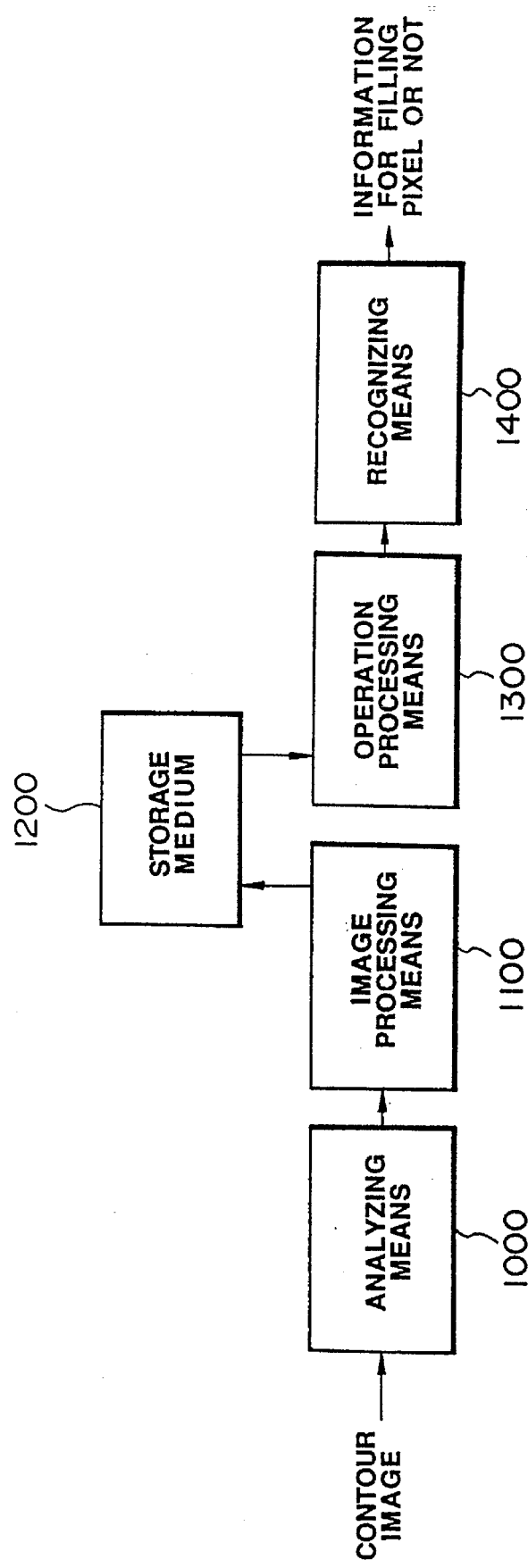
FIG. 1 is a block diagram showing a basic structure of embodiment 1 according to the present invention.

With reference to the drawings, embodiments of the present invention will be described in details below. FIG. 1 shows basic construction of embodiment 1 of the present invention.

In FIG. 1, an image processing apparatus of embodiment 1 creates one or more closed image regions surrounded with a contour drawn by one stroke and fills specific regions among the created one or more closed image regions. Reference numeral 1000 is analyzing means for analyzing whether a progress direction of each line segment of one stroke constituting the contour is a direction of a first straight line or a direction of a second straight line opposite to the first straight line.

Reference numeral 1100 is image processing means for storing a result of the line progress direction analysis in a memory medium 1200 at locations corresponding to pixel position of the line segment.

Reference numeral 1300 is processing means for scanning the expanded result of the analysis in a direction of a third straight line perpendicular to the first straight line, calculating and storing a difference between the total number of a first result of the analysis indicating the direction of the first straight line and the total number of a second result of the analysis indicating the direction of the second straight line from a scanning start position to a current scanning position at each time the result of the analysis having an intersection on the scanning line is detected.

Reference numeral 1400 is recognizing means for judging if the difference is zero or not in each scanning position, and recognizing that the scanning position is an unfilled pixel position when the judgement is affirmative or the scanning position is a filled pixel position when the judgement is negative.

Figure 2:
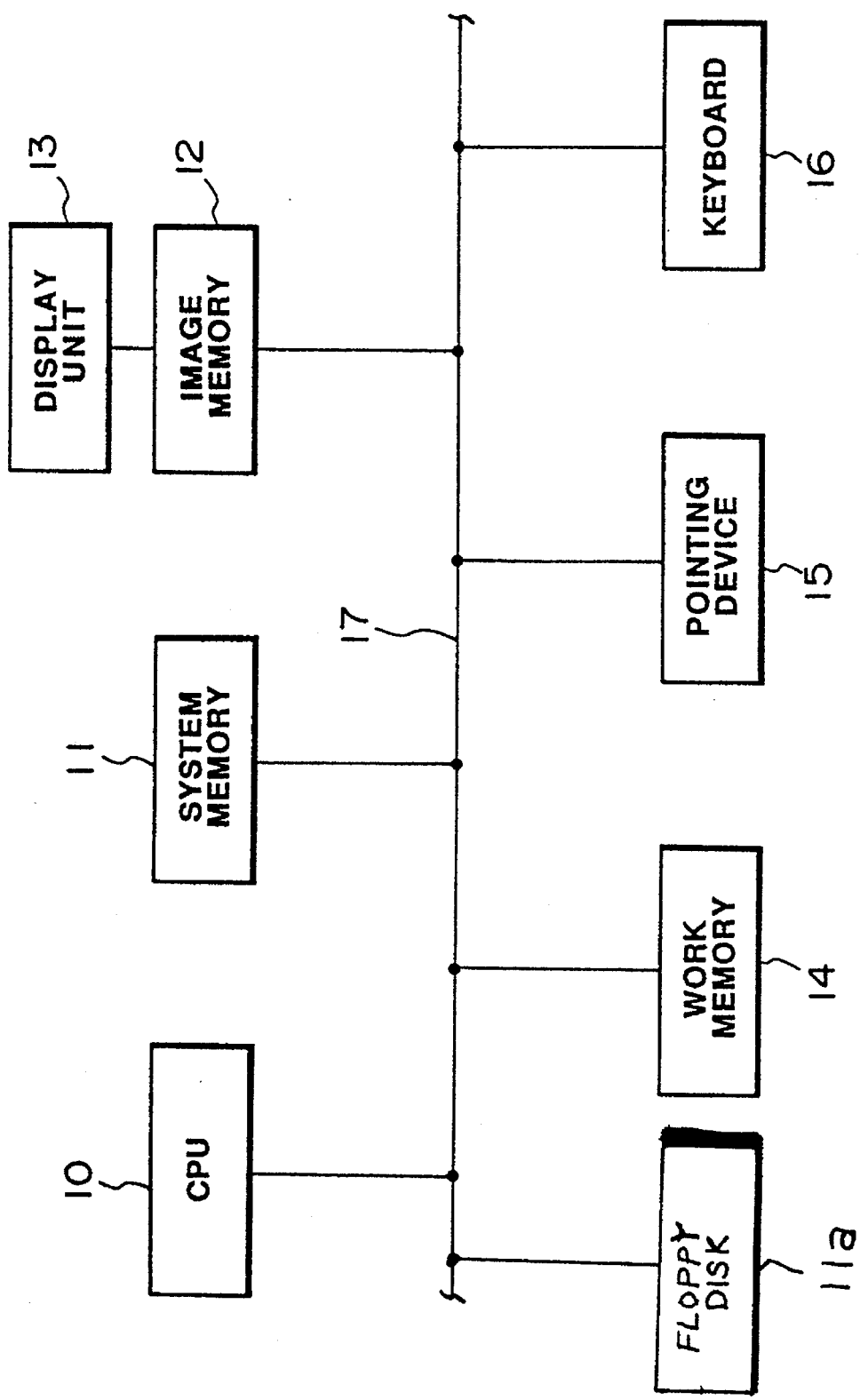
FIG. 2 is a block diagram showing a concrete circuit structure of embodiment 1.

FIG. 2 illustrates a specific circuit diagram of the image processing apparatus of the present invention.

In FIG. 2, the following circuits are connected to a common bus 17: A central processing unit (CPU) 10 executes the control processing of the whole system and the image processing relating to the present invention according to a system program stored in a system memory 11. The system memory 11 stores programs to be executed by CPU 10.

Figure 10:
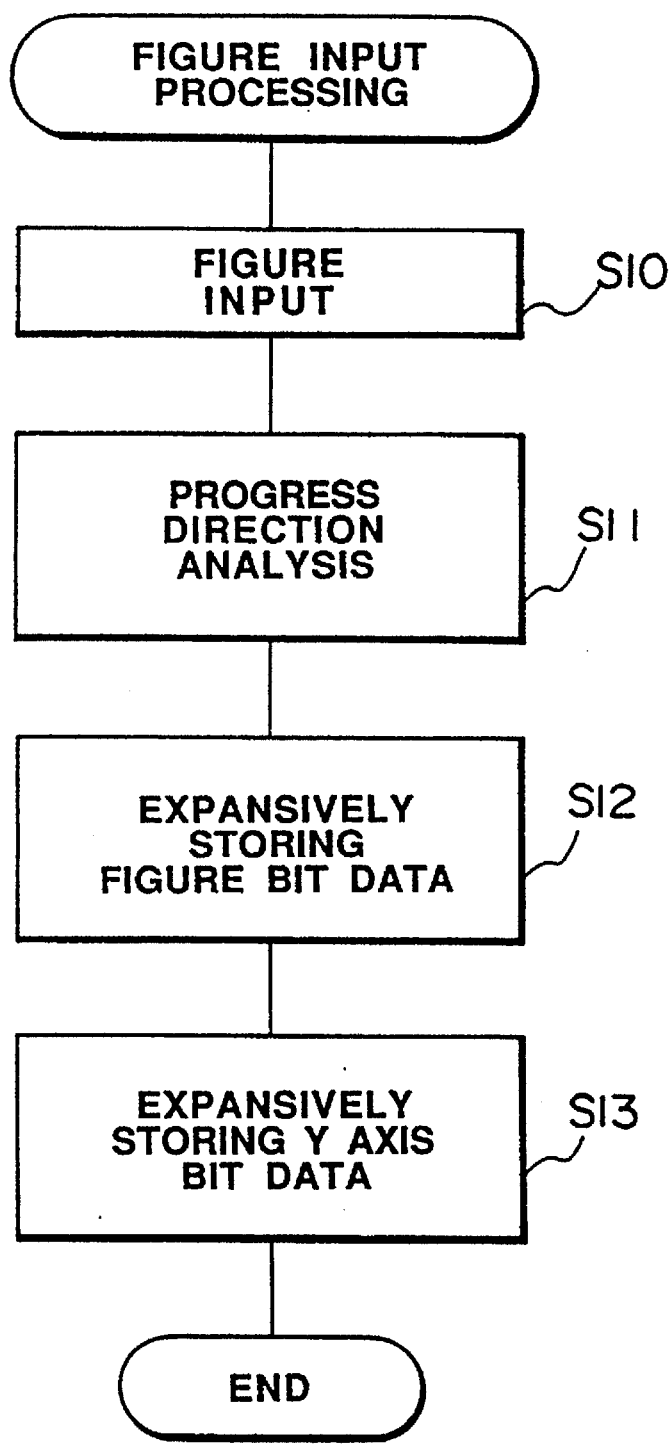
FIG. 10 is a flowchart showing an execution procedure performed by CPU 10 in FIG. 2.
Figure 11:
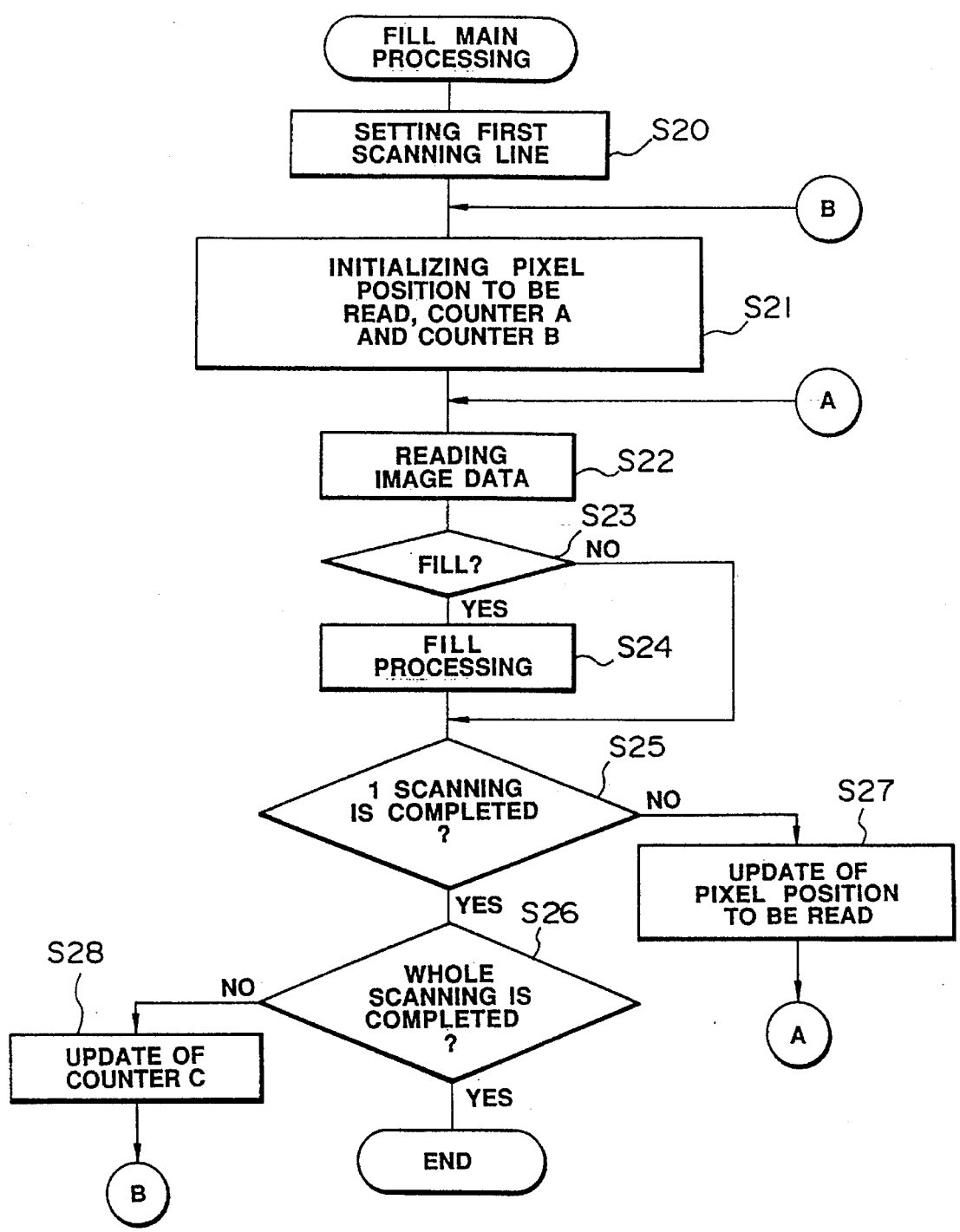
FIG. 11 is a flowchart showing the execution procedure performed by CPU 10 in FIG. 2.
Figure 12:
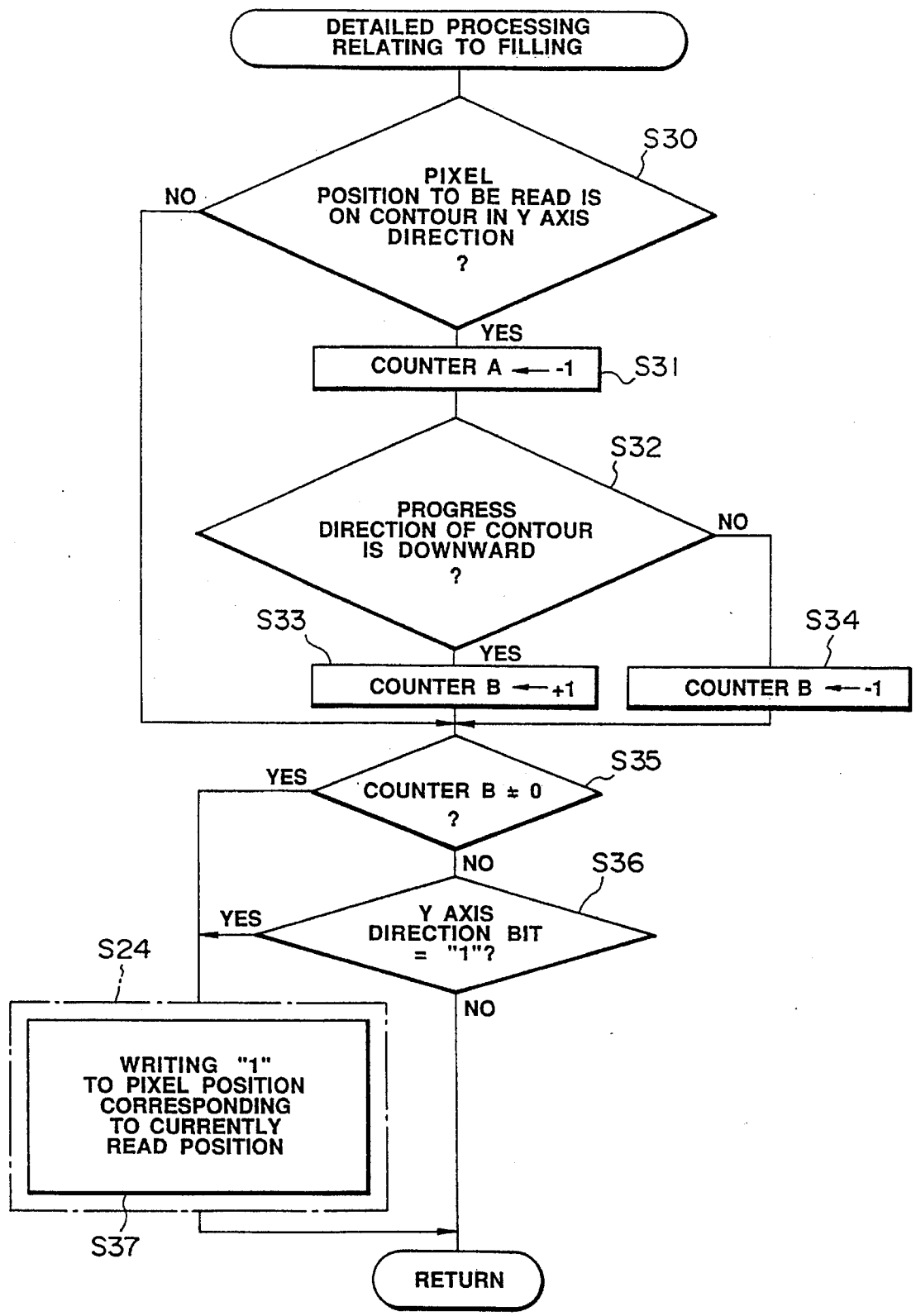
FIG. 12 is a flowchart showing the execution procedure performed by CPU 10 in FIG. 2.

Programs in which a control procedure shown in FIGS. 10 to 12 is described, are stored in the system memory 11. An image memory 12 stores image information to be displayed on a display unit 13 in the form of dots. Image information stored in the image memory 12 is read out at constant periods by the display unit 13, to be displayed visually on a screen.

A work memory 14 temporarily stores data to be used for processing by CPU 10. In the work memory 14, there is provided storage areas for dedicatedly storing figure bit data and Y axis direction bit data relating to the present invention. The figure bit data and Y axis direction bit data will be explained in detail later. As a pointing device 15, a device called a mouse can be used, and the pointing device 15 is used for pointing a position on the screen of the display unit 13. Instruction information to CPU 10 and various kinds of data used for processing by CPU 10 are inputted from a keyboard 16.

The fill processing will be described below and is executed in an image processing apparatus having a circuit structure as shown in FIG. 2.

Figure 3:
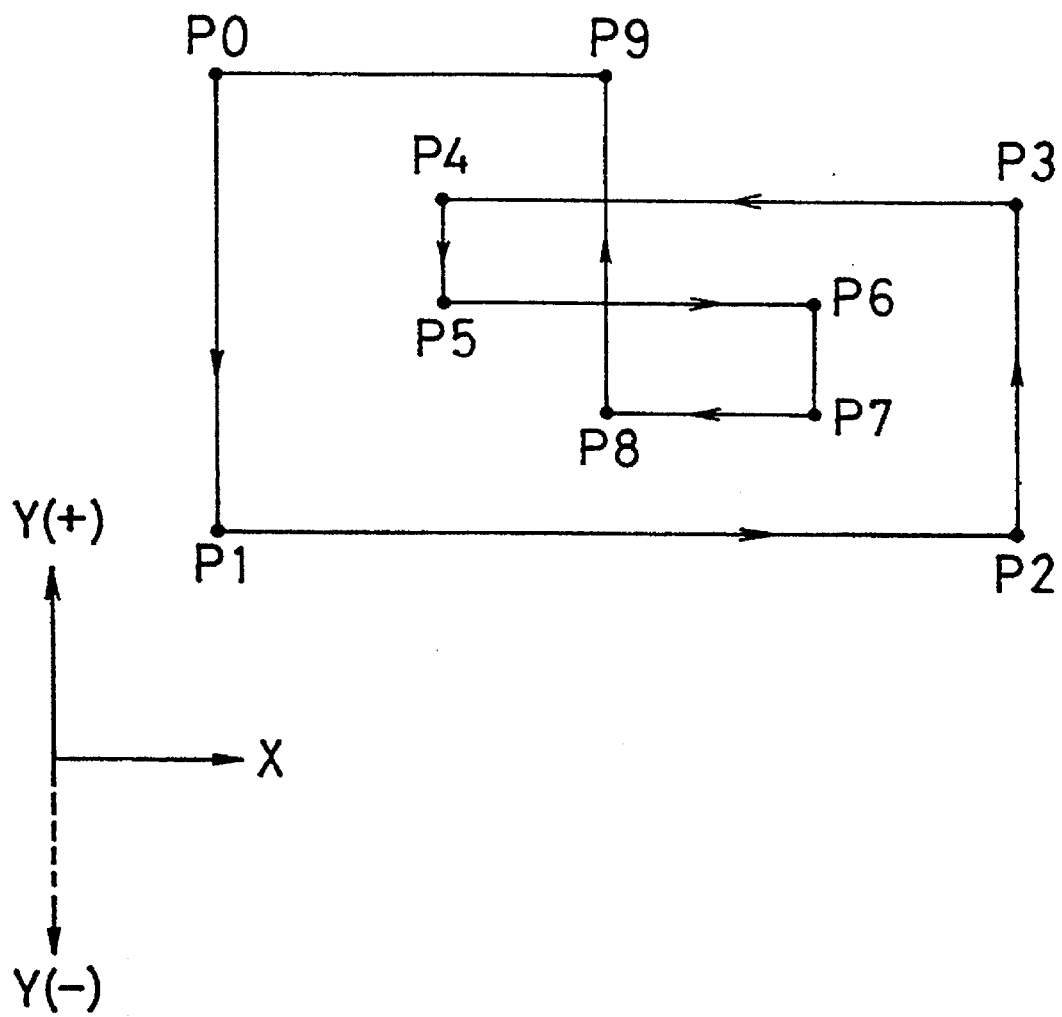
FIG. 3 is a diagram setting forth the plotting steps.

The image of a contour shown in FIG. 3 is used as an example to be filled.

(a) A principle of the fill processing and the fill conditions:

In FIG. 3, a difference of the total numbers between two kinds of line segments lying between a scanning start position and a current scanning position, is calculated during scanning in the X axis direction. In FIG. 3, line segments to be evaluated are two kinds of line segments: those progressing in the plus direction of the Y axis and those progressing in the minus direction of the Y axis. If the difference between the current total numbers (counts) of the two kinds of line segments is not zero, a pixel corresponding to the current scanning position is filled. To the contrary, if the difference is zero, a pixel corresponding to the current scanning position is not filled.

In an oblique line image shown in FIG. 4, partial line segment images parallel to the X axis or the Y axis closer to the oblique line image, are concatenated along the oblique line to form a display image. Such a method for creating an oblique line image is often used if an oblique line is displayed on a screen of a display unit with a small amount of pixels.

Figure 5A:
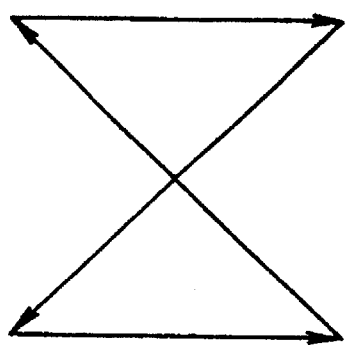
FIG. 5 is a view for explaining a point not to be filled on an image of a contour.
Figure 5B:
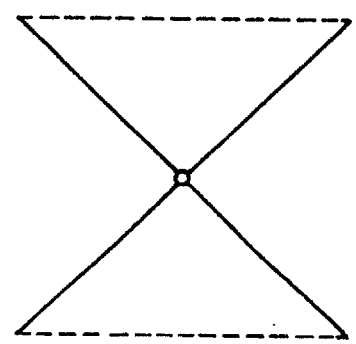
Figure 6A:
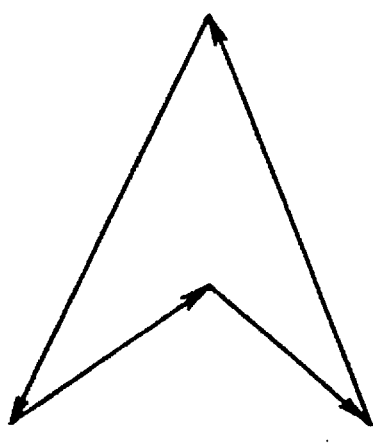
FIG. 6 is a view for explaining a point not to be filled on the image of the contour.
Figure 6B:
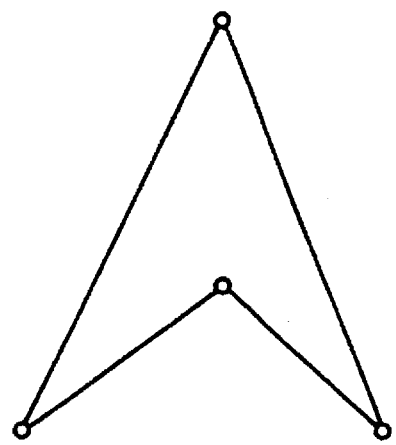

If two line segments connected to the same end point have the same progress direction for the Y axis, the end point is to be filled. If the two line segments do not have the same progress direction, the end point is not to be filled (the end point is marked by an open circle in FIGS. 5 B and 6 B).

FIG. 7 A shows a plurality of intersecting line segments. In this case, if progress directions for the Y axis of the plurality of line segments are not the same, the intersection is not to be filled.

Intersections not to be filled are marked by an open circle in FIG. 7 B corresponding to the figure in FIG. 7 A.

(b) Circuit operation: b-1: The processing of creating an image surrounded by a contour.

Next, a circuit operation will be described with reference to FIG. 2. If an image to be filled is created, CPU 10 creates image data representing an image shape according to an execution procedure in FIG. 10 and then stores the image data into the work memory 14. In more detail, CPU 10 receives an input data indicating end point position coordinate data on the image of a contour from the pointing device 15 (step S10). If an operator inputs an image of a contour drawn by one stroke shown in FIG. 3, end points are inputted in the order of P0, P1, P2 ..... P9, and P0.

CPU 10 temporarily stores the end point positions in the input order on the work memory 14. Subsequently, CPU 10 determines a progress direction of the line segment linking the above two end points together by checking a difference between Y coordinate values of two neighboring end points on the work memory 14(step S11). If the line segment which goes from a first point to a second point proceeds to the minus Y direction in FIG. 3, the relation shows that the Y coordinate value of the first point is larger than the Y coordinate value of the second point. If the line segment proceeds to the plus Y direction, the relation is reversed.

If the line segment intersects the Y axis at 90 degrees, both Y coordinate values are the same.

After CPU 10 analyzes a progress direction of line segments linking each end point in FIG. 3 by the above method, CPU 10 stores a result of the analysis on the work memory 14. At this time, CPU 10 works as analyzing means and image processing means of the fifth aspect of the present invention. In the embodiment, the result of the analysis data are divided into two kinds of data, a first data and a second data. The first data are called figure bit data. Figure bit data (the second information in the second aspect of the present invention) represent a dot position of a line segment which is parallel to the Y axis, i.e., the plus and minus Y directions, and are stored in expanded form in a first dedicated region on the work memory 14 corresponding to each of the pixel positions (step S12). The contents of figure bit data corresponding to FIG. 3 are shown in FIG. 8. In FIG. 8, symbol "." is stored as bit "1" and symbol "x" is stored as bit "0" on the work memory 14.

Additionally, bit "0" is allocated to any line segment perpendicular to the Y axis and to the background image other than a contour.

Figure 9:
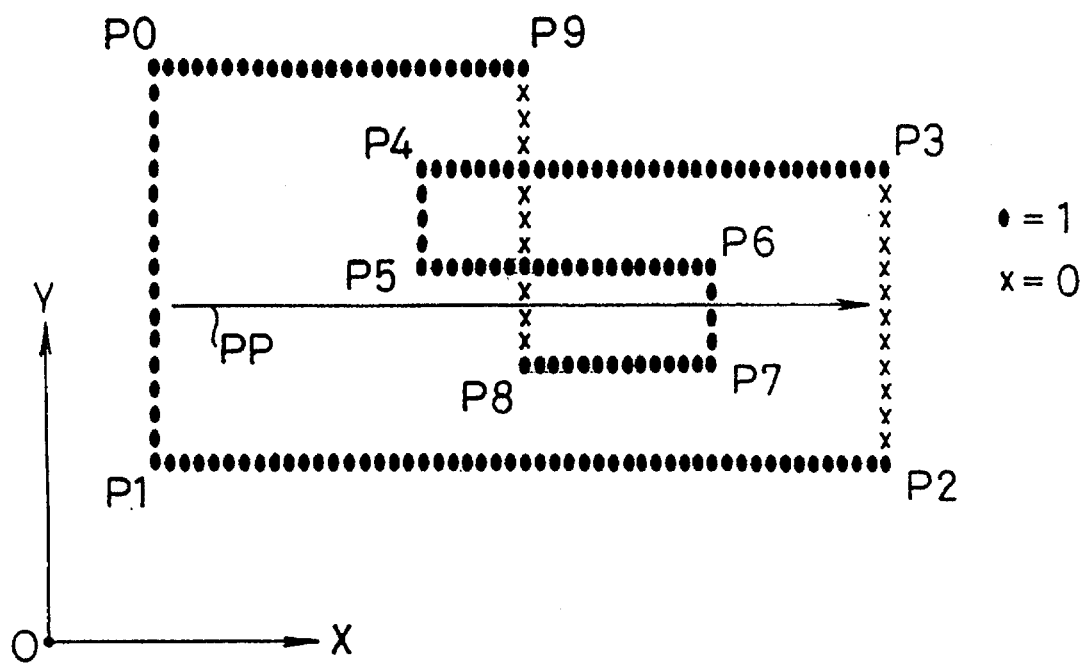
FIG. 9 is a view showing contents of Y axis direction bit data.

The second data out of the two kinds of data representing the result of the analysis are called Y axis direction bit data (the first information in the second aspect of the present invention). Y axis direction bit data is data indicating for each dot position whether the line segment is oriented in the minus Y direction or is perpendicular to the Y axis, and is stored in expanded form in a second dedicated region on the work memory 14 corresponding to each of the pixel positions (step S13). The contents of Y axis direction bit data corresponding to FIG. 3 are shown in FIG. 9. In FIG. 9, symbol "." is stored as bit "1" and symbol "x" is stored as bit "0" on the work memory 14.

Bit "0" is allocated to all parts of the image other than a line segment of the minus Y direction and a line segment perpendicular to the Y axis. Figure bit data represent a boundary line between a region to be filled and a region not to be filled, and Y axis direction bit data are used to detect a pixel position to be filled.

b-2: The fill processing

After having created figure bit data and Y axis direction bit data relating to the image of the contour, CPU 10 creates a filled image in a third dedicated area in the work memory 14 according to FIG. 11. In more detail, CPU 10 sets a scanning start position in the first dedicated region and the second dedicated region for reading (step S20). In the embodiment, a scanning start line position is set to a scanning line which pass through an end point having the minimum Y coordinate value. In the case of FIGS. 8 and 9, a first scanning line position is set to a position of a scanning line which passes through end points P1 and P2. Moreover, an end point having the minimum X coordinate value is selected as a scanning start position in the X axis direction. In FIGS. 8 and 9, a pixel position of the end point P1 is selected as a scanning start position in the X axis direction.

CPU 10 reads out figure bit data and Y axis direction bit data from the work memory 14 along the X direction from an initialized pixel position. CPU 10 determines whether a pixel is to be filled or not on a basis of sequentially read figure bit data and Y axis direction bit data. CPU 10, which performs the above sequential processing, acts as processing means and recognizing means of the fifth aspect of the present invention. The determination will be described in details later in FIG. 12.

If the result of the determination is that the pixel is to be filled, CPU 10 performs the fill process by storing a bit "1" in the pixel position of a third dedicated area corresponding to the read pixel position. (step S24). After a set of figure bit data and Y axis direction bit data are read out and the fill processing is performed, CPU 10 then updates the read position and reads out the above two data items for the next pixel position (step S25→S27→S22).

The above execution procedure (loop processing of step S22→S25→S27) is repeated, and a filled image is created in the third area on the work memory 14. If CPU 10 detects that the scanning reaches an end point position P2 in FIGS. 8 and 9, the read scanning line is updated to the next one (the Y value is incremented) and the above execution procedure is repeated.

In the embodiment, the number of line segments parallel to the Y axis are counted at the scanning time so as to check the scanning termination and the scan is terminated when the number of line segments has reached that predetermined value. For this purpose, counter A for counting the number of line segments is provided. Counter A is a down counter. In the initialization processing of step S20 in FIG. 11, the number of line segments on each scanning line is counted by CPU 10. More specifically, figure bit data "1" on each scanning line are counted and then the counted value is stored in the work memory 14 as initial value data to be set in counter A.

Moreover, the number of lines between both ends of a contour image is used to determine whether the whole scanning has been finished or not. The count processing of counter A is performed in the execution procedure shown in FIG. 12.

The number of scanning lines to be filled is counted by counter C, which is updated when one line scanning termination is detected (step S26→S28).

Next, with reference to FIG. 12, steps S23 and S24 shown in FIG. 11 will be described in details.

In FIG. 12, CPU 10 determines whether a pixel position read as figure bit data and Y axis direction bit data is a pixel position on a contour parallel to the Y axis direction. This determination is a process for detecting a line segment parallel to the Y axis direction.

If read figure bit data is bit "1", the affirmative determination is made and counter A is decremented by one (step S30→S31).

Next, whether the progress direction of the line segment is the minus Y axis direction or the plus Y axis direction, is recognized based on Y axis direction bit data. If Y axis direction bit data is "1", the minus Y axis direction is the result of the recognition ("YES" is determined in step S32). Counter B is incremented by one, which counts the difference between the total number of line segments of the minus Y axis direction and the total number of line segments of the plus Y axis direction. When the progress direction of the line segment is determined to be the plus Y axis direction, counter B is decremented by one. If the read pixel position is not on the contour parallel to the Y axis direction, count process of counters A and B are not executed and CPU 10 skips the execution procedure from step S30 to step S35.

CPU 10 checks whether the current value in counter B is not zero to determine whether the above fill processing is to be executed or not. If YES judgement is obtained (the current value in counter B is not zero), CPU 10 determines that the current read pixel position is in an image region to be filled and writes bit "1" in the third area in the work memory 14 corresponding to the current read pixel position (step S35→S37).

In the case that YES judgement is not obtained in step S35, where Y axis direction bit data is "1", CPU 10 determines that the read pixel position is on a line segment perpendicular to the Y axis direction and the fill processing is executed (step S36→S37). If YES judgement is not obtained ill steps S35 and S36, it is determined that the current read pixel position is out of the region to be filled and the fill processing in step S37 is skipped.

With respect to specific line fill processing, the execution procedure shown in FIGS. 11 and 12 will be described below. An example is shown in FIGS. 8 and 9. In the example, figure bit data and Y axis direction bit data are read along line segments.

First, figure bit data and Y axis direction bit data corresponding to pixel positions on a line segment linking end point P0 with end point P1, are read out (step S21→S22 in FIG. 11), and then the execution procedure shown in FIG. 12 is performed. Here, it is confirmed that a current read pixel position is in parallel to the Y axis and on a line segment of the minus Y direction (see FIG. 3, and step S30→S32 in FIG. 12). Thus, counter A containing an initial value "4" is decremented by one to a count value "3" (step S31 in FIG. 12). Moreover, counter B containing an initial value "0" is incremented by one to a count value "1". Since a value in counter B is not zero, a pixel position on the line segment P0–P1 is determined to be filled and bit "1" is written in the third dedicated region corresponding to the pixel position (step S35→S37 in FIG. 12)

The present execution procedure of CPU 10 is returned to the execution procedure shown in FIG. 11, if it is confirmed that one scan line of the image region has not been completed, then figure bit data and Y axis direction bit data of the next pixel position are read out. It is determined that the current read pixel position is not on a contour (a line segment parallel to the Y axis direction) in the process for detecting a progress direction of a contour (step S30 in FIG. 12) in the next fill processing step (step S23 in FIG. 11).

Since the current value "1" is in counter B, the pixel position is determined to be filled and the fill processing is executed (step S30→S35→S37).

A group of pixels in the direction of line PP, which are put between line segment P0–P1 and line segment P9–P8 shown in FIGS. 8 and 9, and are all filled, since the value in counter B is not updated and then the above procedure is repeated.

When a read pixel position reaches a position of line segment P9–P8 shown in FIGS. 8 and 9, the read pixel position is updated (step S25→S27→S22). It is determined that the read pixel is positioned on a line segment of the plus Y axis direction, and the value in counter B is decremented by one (step S32→S34 in FIG. 12). Here, a count value in counter B reaches "0".

It is determined that the read pixel position is not on a line segment of the minus Y axis direction and on a line segment parallel to the X axis direction. As a result, in this read pixel position, the fill processing is not executed (step S35→S36→RETURN in FIG. 12).

Counter B remains in "0" and is not updated until the read pixel position reaches line segment P6–P7, and the fill processing also is not performed (repetition of step S30→S35→S36→RETURN in FIG. 12).

When the read pixel position along line PP is located on line segment P6–P7, it is determined that the pixel position has reached a line segment of the minus Y axis direction (see FIG. 3), and then a count value in counter B is updated from "0" to "1" and the fill processing is performed (step S32→S33→S35→S37 in FIG. 12). Since counter B is not updated until the read pixel position reaches line segment P3–P2 in FIGS. 8 and 9, a group of the pixel positions lying between line segment P6–P7 and line segment P3–P2 are filled (repetition of step S30→S35→S36→S37 in FIG. 12).

When the read pixel position reaches line segment P3–P2 in FIGS. 8 and 9, a count value in counter B is updated to "0" and the fill processing is completed (step S35→S36→RETURN in FIG. 12). Moreover, since a count value in counter A reaches "4", it is confirmed that scanning for reading a scan line is finished (step S25 in FIG. 11).

Figure 13:
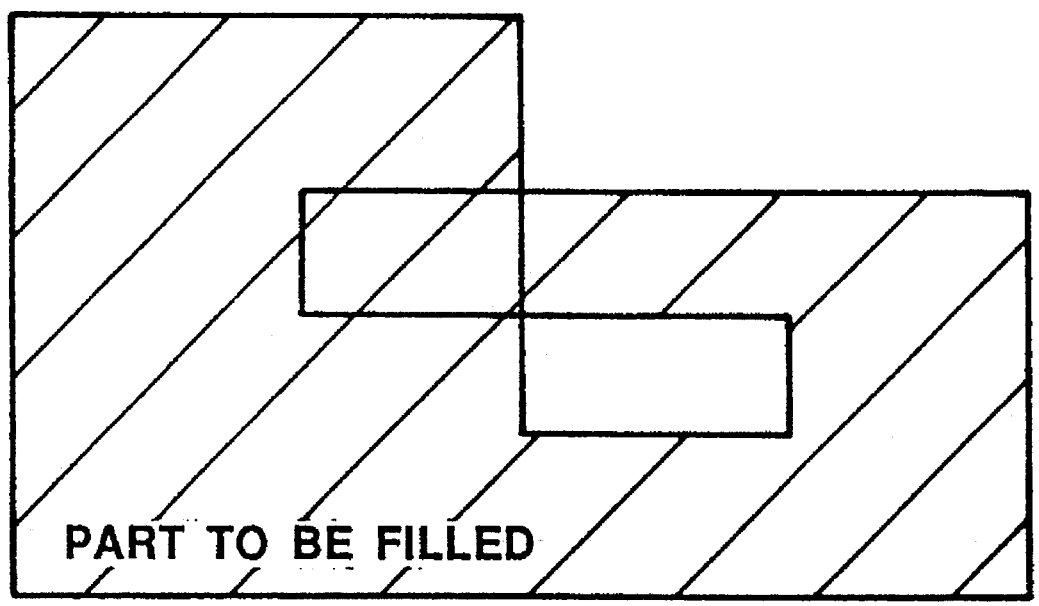
FIG. 13 is a view showing the result of the fill processing obtained from the figure in FIG. 3.

After the above processing is performed on a closed area formed by a contour, a region shown by oblique lines in FIG. 13 has been filled. After the fill processing is completed, the filled image formed in the third area in the work memory 14 is transferred to the image memory 12 by CPU 10 and then the filled image is displayed on a screen of the display unit 13.

Figure 14:
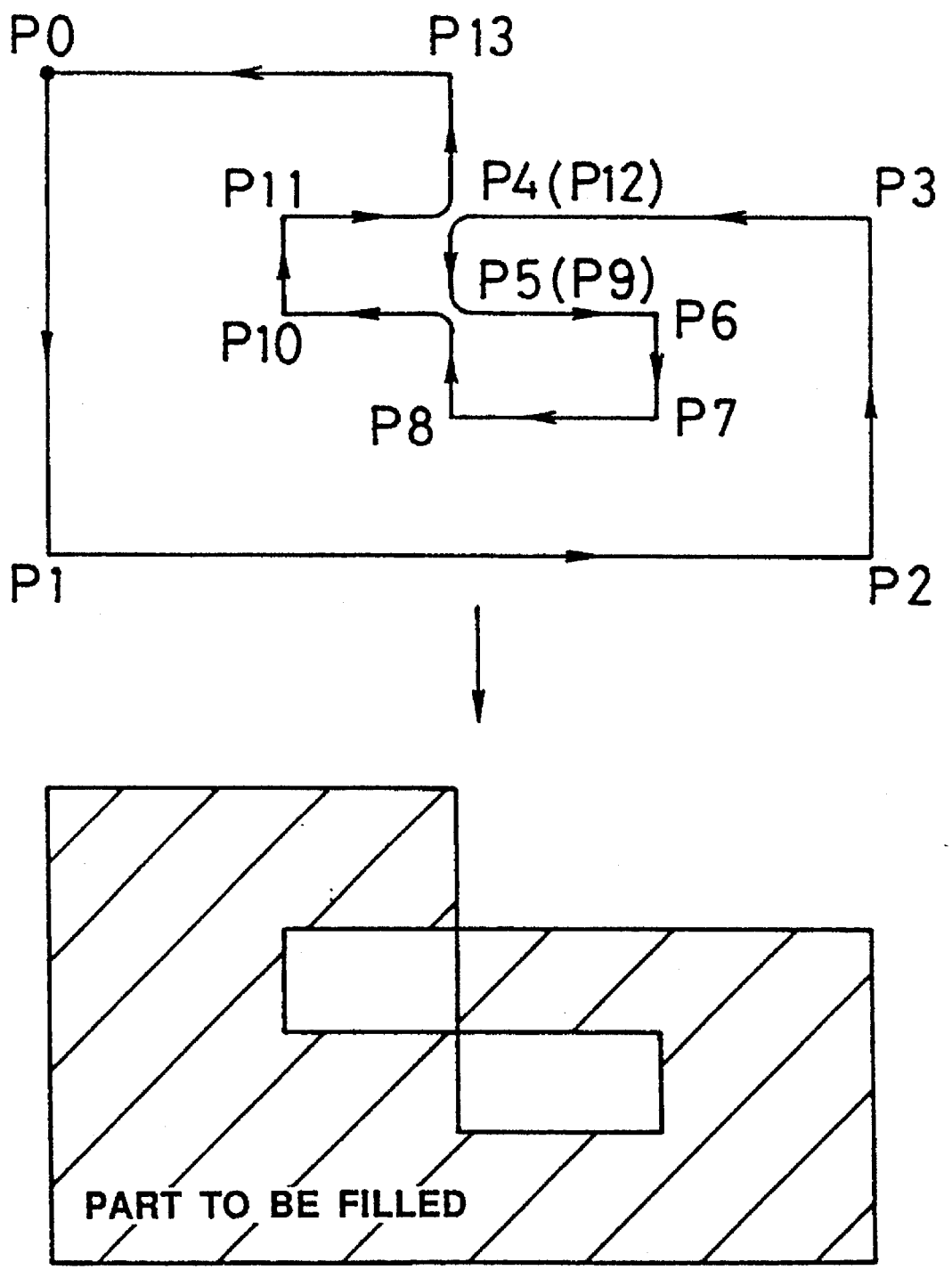
FIG. 14 is a view showing another steps of one stroke for the figure image in FIG. 3 and the result of the filling.

The present invention has an advantage that even if a figure to be filled is the same, an image region to be filled is changeable by changing progress steps of one stroke. For example, if the progress steps of one stroke shown in FIG. 3 is changed to the progress steps of one stroke shown in FIG. 14, an image in which a filled part is shown by oblique lines is obtained in FIG. 14.

Another alternate embodiment is described below.

(1) Though figure bit data and Y axis direction bit data are stored individually in separate memory areas in embodiment 1, the two data can be stored in one memory area by combining the two data to consist of two (2) bits.

(2) In embodiment 1, only figure data formed by a contour drawn by one stroke are to be scanned. Even if image data of one entire screen are scanned, a result similar to that of embodiment 1 can be obtained. In this case, since a scanning start position and a scanning termination position are fixed, the present invention can be easily realized by hardware.

(3) In embodiment 1, the fill processing for a binary image has been explained. However, if an image region formed with bits 1 is to be erased, image processing similar to that of embodiment 1 can be realized. Further, it goes without saying that the fill processing of the present invention can be applicable not only to a binary image but also to a color image.

Second Embodiment

In embodiment 1, a progress direction of a line segment linking end points is represented by binary vector information. Embodiment 2, in which a progress direction of a line segment is represented by multi-value vector information, will be described below. Circuit construction of embodiment 2 is similar to that of embodiment 1. So, the difference between embodiment 1 and embodiment 2 will be described.

FIG. 15 shows the content of image vector information stored in the work memory 14 together with image end point coordinate data. Here, the vector information is shown represented in decimal numbers, but actually binary numbers are used. Vector information of a numeric value "1" means that a progress direction of a line segment is the minus Y direction. But, the progress direction of the line segment is not necessarily in parallel to the Y axis direction.

Vector information of a numeric value "2" means that the progress direction of a line segment is the plus Y axis direction. Vector information of a numeric value "3" means that the progress direction of a line segment is perpendicular to the Y axis direction, i.e., in parallel to the X axis direction. Vector information of a numeric value "0" is used for image data other than a figure to be filled.

Figure 16:
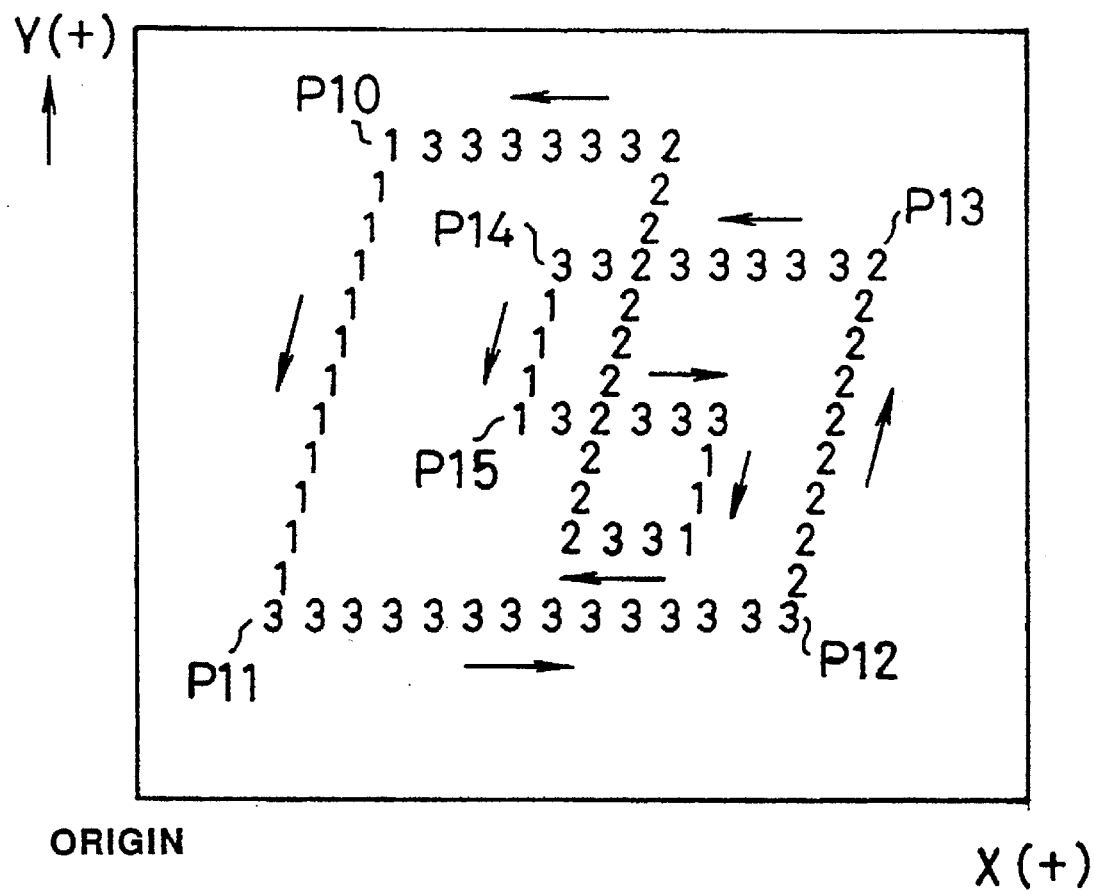
FIG. 16 is a view showing the contents of vector information expanded in a memory.

As explained in embodiment 1, the progress direction can be analyzed by comparing Y coordinate values of neighboring two end points. Thus, when a figure is created, the above vector information is stored in the work memory 14 by CPU 10 corresponding to the above analysis. FIG. 16 illustrates an example of a figure image to be filled, which is formed on the work memory, based on end point position information and vector information in FIG. 15. In this example, in advance, one of vector information of numeric values "1", "2" and "3" is allocated to each pixel position forming a line segment of the figure, and vector information of a numeric value "0" is allocated to a pixel position other than the above pixel position. As in embodiment 1 vector information in FIG. 16 is scanned in the X axis direction to set a counter to be incremented or decremented by detecting a line segment in the plus or minus Y axis direction. In embodiment 2, a pixel position in which a count value in the counter becomes "0", is filled.

Figure 17:
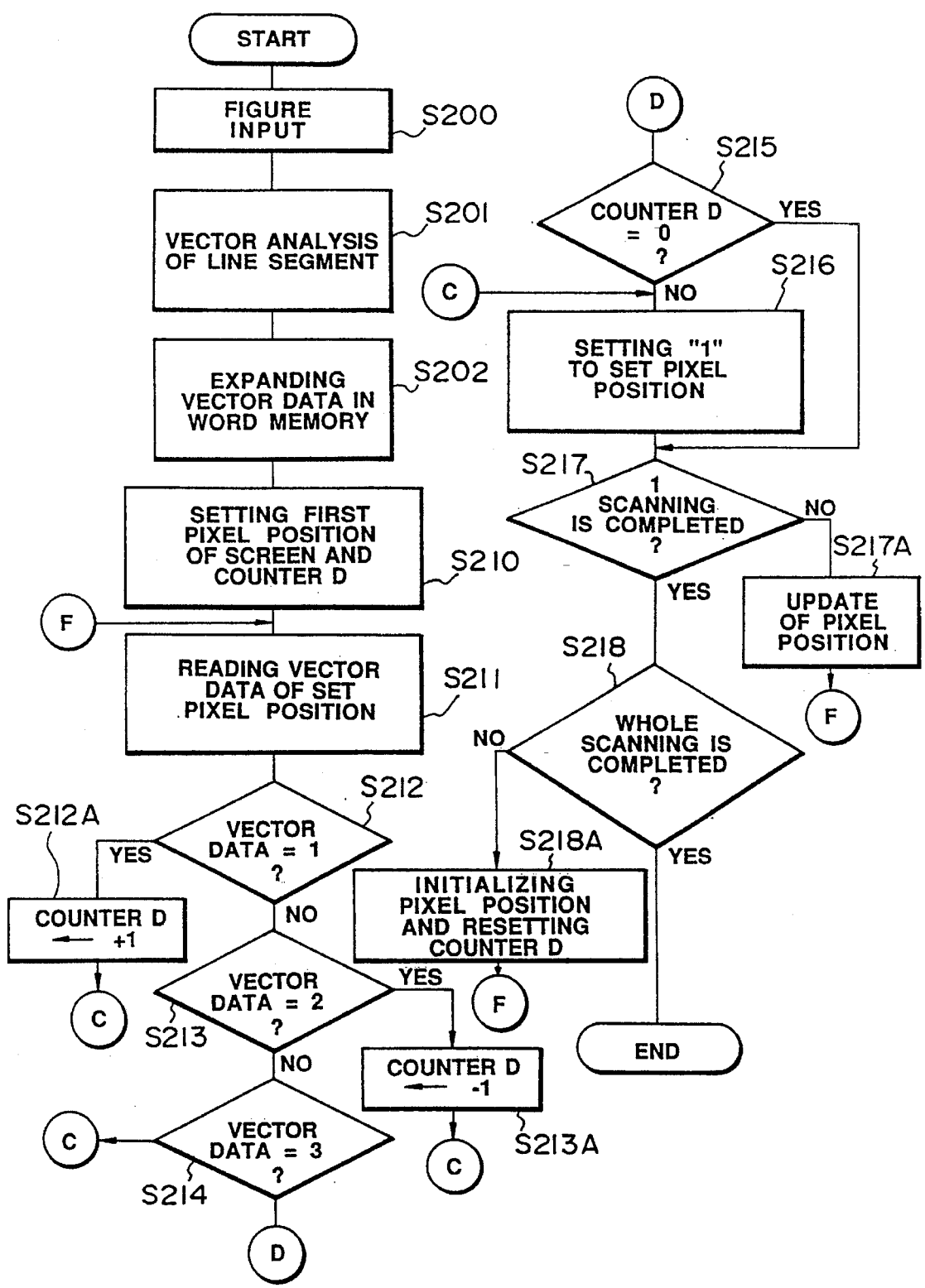
FIG. 17 is a flowchart showing an execution procedure preformed by CPU 10 in embodiment 2.
Figure 18:
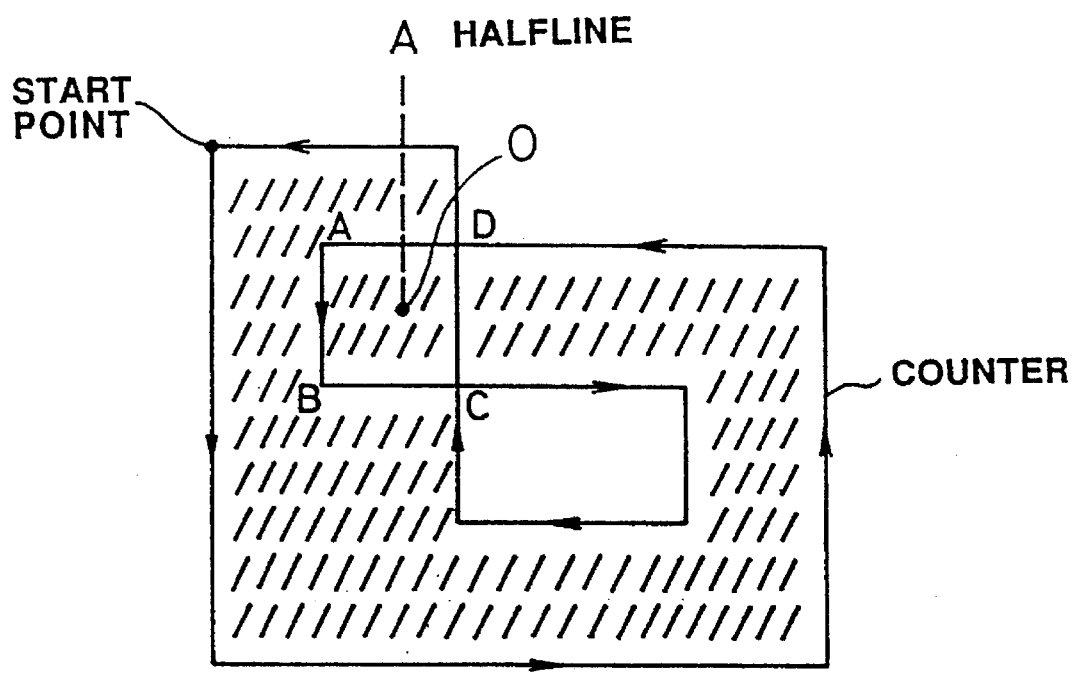
FIG. 18 is a view showing a procedure for the fill processing procedure in the prior art.

FIG. 17 shows the fill processing procedure using the above vector information. When end point positions of a figure are inputted from the pointing device, CPU 10 stores them on the work memory 14 in these input order (see FIG. 15, step S200). Next, CPU 10 analyzes the end point positions as shown in FIG. 16, and then gets vector information as shown in FIG. 15 (step S201). CPU 10 expands vector information on the work memory 14 corresponding to pixel positions of the line segment of the figure image, and creates the figure image (step S202).

CPU 10 starts scanning at the origin of the image screen on the work memory 14. When CPU 10 detects vector information "1", CPU 10 increments (D) counter by one (step S212→S212A), when it detects vector information "2", CPU 10 decrements (D) counter by one (step S213→ S213A).

All of the pixel positions, in which the counter does not indicate "0", are to be filled (step S215→S216).

Embodiment 2 has an advantage that an oblique image does not have to be divided into line segments of the Y axis direction. But, since multi-value data are used as vector information, capacity of the work memory 14 may need to be made greater than that of embodiment 1.

Besides embodiment 1 and embodiment 2, the following embodiment can be realized.

(1) If shape data of a figure are inputted with regard to not only end point data but also a plotting instruction, a curved figure such as a circle call be filled. In this case, the plotting instruction is inputted from a keyboard 16.

(2) If figure bit data and Y axis direction bit data of embodiment 1 are stored in a storage medium such as a floppy disk as figure image data, an operator can create a filled image without inputting image data from the pointing device 15, In this case, after CPU 10 reads out figure bit data and Y axis direction bit data on the work memory from a floppy disk via a floppy disk drive 11a, and then CPU 10 performs the execution procedure following step S11 in FIG. 10.

(3) A line element in an image to be filled in the Y axis direction is detected in embodiment 1 and embodiment 2, but a line element of the X axis direction can be also detected without limitation of the Y axis direction.

(4) In embodiment 1 and embodiment 2, to fill the inside of a closed region, when counter B contains a value other than "0", a pixel position is filled. But, when a region outside of the closed image region is filled, the determination condition is that counter B contains a value other than 1.

ADVANTAGES OF THE INVENTION

As described above, the present invention is different from prior art in which it must be determined whether a progress direction of a contour drawn by one stroke is clockwise or counterclockwise in order to determine a region to be filled. In the present invention, a progress direction relative to the direction of a single line such as the Y axis, need only be investigated. Thus, the fill processing can be simplified, the processing time can be shortened, and required memory capacity can be minimized.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A method of creating and filling one or more closed image regions with a continuous closed contour having a plurality of line segments each being formed of a plurality of pixels at pixel positions and being joined at endpoints, comprising the steps of:

performing the following steps for each line segment of said plurality of line segments:

determining a progress direction of said line segment as a first direction or a second direction opposite to said first direction, or a third direction perpendicular to said first direction;

storing an affirmative direction indicator of said progress direction in a first area of a storage medium at a pixel position corresponding to each pixel position of said line segment determined to progress in said second direction or storing a negative direction indicator of said progress direction in said first area of said storage medium if said progress is in said first direction; determining whether said line segment is parallel to said first direction;

storing an affirmative contour indicator, if said parallel segment determination is true, in a second area of said storage medium at a pixel position corresponding to each pixel position of said line segment;

scanning the storage medium by successively reading pixels from said first and second storage areas along a scanning line in said third direction perpendicular to said first direction and accumulating and storing a difference between the total number of pixels read that have an affirmative contour indicator and have said affirmative direction indicator and the total number of pixels read that have an affirmative contour indicator and have said negative direction indicator from a scanning start position till a current scanning position; and filling each of said read pixels if said difference is greater than or equal to zero or said contour indicator is not affirmative while said direction indicator is affirmative.

2. An image processing method as claimed in claim 1, wherein an up-down counter is used to accumulate said difference, and said accumulation is performed only when an intersection of the closed image region and said scanning line is detected from the contour indicator read from said second memory area, and said up-down counter is incremented by one in the case where the direction indicator read from said first storage location is affirmative and said up-down counter is decremented by one in the case where the direction indicator read from said first storage location is negative.

3. An image processing method as claimed in claim 1, wherein said progress direction of said line segment of said plurality of line segments in said contour is analyzed to determine whether it is parallel to said third direction, and said result of the analysis is expressed in multibit values which indicate that said progress direction of said line segment is said first direction, said second direction or said third direction.

4. An image processing apparatus which creates and fills one or more closed image regions with a contour drawn by a continuous closed line having a plurality of line segments each having a plurality of pixels, comprising:

means for determining a progress direction of each of said plurality of line segments as being in a first direction or a second direction opposite to said first direction;

means for storing an indicator representing the determined progress direction, said means storing an affirmative progress direction, said means storing an affirmative indicator only if said progress direction is in said second direction, on a first area of a storage medium at pixel positions corresponding to each pixel position of said each line segment;

means for determining whether said each line segment is parallel to said first direction;

means for storing for each pixel of said each line segment an affirmative figure intersection point indicator, if said parallel segment determination is true, on a second area of said storage medium at each pixel position corresponding to each pixel position of said line segment;

means for scanning said storage medium in a third direction perpendicular to the first direction, calculating and storing a difference between the total number of affirmative progress direction indicators at affirmative figure intersection points and the total number of not affirmative progress direction indicators at affirmative figure intersection points from a scanning start position till a current scanning position; and means for filling a scanning position if said difference is not zero.

5. A computer program product having a computer readable medium having computer program logic recorded thereon for creating and filling one or more closed image regions based on a contour drawn as a continuous series of line segments each having a plurality of pixels, said computer program product comprising:

analyzing means for determining a progress direction of each of said plurality of line segments as a first direction or a second direction opposite to said first direction;

image processing means for storing in a first storage location of a storage medium, a direction indicator for each pixel of said each line segment, said indicator being affirmative if said progress direction is determined to be in said second direction and negative if said direction is determined to be in said first direction;

means for determining whether said each line segment of said plurality of line segments is parallel to said first direction;

means for storing for each pixel of said each line segment in a second storage location of said storage medium, an affirmative figure point indicator, if said parallel segment determination is true;

processing means for scanning said first and second storage locations in a third direction perpendicular to the first direction, calculating and storing a difference between the total number of affirmative direction indicators and the total number negative direction indicators from a scanning start position till a current scanning position at each time said scan encounters an affirmative figure point indicator; and means for filling a scanned pixel if said difference is not zero.

\* \* \* \* \*